United States Patent
Pandey et al.

(10) Patent No.: US 11,653,047 B2
(45) Date of Patent: May 16, 2023

(54) CONTEXT BASED ADAPTIVE RESOLUTION MODULATION COUNTERING NETWORK LATENCY FLUCTUATION

(71) Applicant: International Business Machines Corporation, Armonk, NY (US)

(72) Inventors: Diwesh Pandey, Bangalore (IN); Tathagato Bose, Kolkata (IN); Arun Joseph, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 17/388,439

(22) Filed: Jul. 29, 2021

(65) Prior Publication Data

US 2023/0033966 A1 Feb. 2, 2023

(51) Int. Cl.
*H04N 21/2662* (2011.01)
*H04N 21/24* (2011.01)
(Continued)

(52) U.S. Cl.
CPC ......... *H04N 21/2662* (2013.01); *H04N 19/17* (2014.11); *H04N 19/20* (2014.11); *H04N 21/2402* (2013.01); *H04N 21/2405* (2013.01)

(58) Field of Classification Search
CPC .... H04N 19/17; H04N 19/20; H04N 21/2402; H04N 21/2405; H04N 21/2662
See application file for complete search history.

(56) References Cited

U.S. PATENT DOCUMENTS

| 6,490,319 B1 * | 12/2002 | Yang | H04N 19/17 375/E7.238 |
| 9,774,823 B1 | 9/2017 | Gadnir et al. | |

(Continued)

FOREIGN PATENT DOCUMENTS

| CN | 101147391 A | 3/2008 |
| CN | 102918836 A | 2/2013 |

(Continued)

OTHER PUBLICATIONS

PCT, Notification of Transmittal of The International Search Report and The Written Opinion of The International Searching Authority, or the Declaration for Application PCT/CN2022/097109 dated Aug. 29, 2022.

(Continued)

*Primary Examiner* — George C Neurauter, Jr.
(74) *Attorney, Agent, or Firm* — Patterson + Sheridan, LLP

(57) ABSTRACT

A method includes communicating a first stream of a video comprising first and second objects to a device. The first stream has a first resolution. The method also includes communicating a second stream to the device. The second stream indicates that the first object is contextual and that the second object is non-contextual. The method further includes, after a decrease in bandwidth, communicating a third stream of the video to the device. The third stream has a second resolution that is lower than the first resolution. When the video is presented for display using the third stream and based on the second stream indicating that the first object is contextual and that the second object is non-contextual, the first object is presented in the first resolution and the second object is presented in the second resolution.

20 Claims, 9 Drawing Sheets

(51) Int. Cl.
*H04N 19/20* (2014.01)
*H04N 19/17* (2014.01)

(56) References Cited

U.S. PATENT DOCUMENTS

| | | | |
|---|---|---|---|
| 11,240,570 B1* | 2/2022 | Fu | G06V 20/49 |
| 2005/0140781 A1* | 6/2005 | Chi | H04N 19/154 |
| | | | 375/E7.176 |
| 2006/0176951 A1* | 8/2006 | Berman | H04N 21/4223 |
| | | | 375/240.01 |
| 2008/0168512 A1* | 7/2008 | Nguyen | H04N 21/812 |
| | | | 348/E7.063 |
| 2009/0167948 A1* | 7/2009 | Berman | H04N 21/4728 |
| | | | 348/E7.004 |
| 2009/0201378 A1 | 8/2009 | Kondo | |
| 2011/0280311 A1 | 11/2011 | Chen et al. | |
| 2013/0195178 A1* | 8/2013 | Price | H04N 19/115 |
| | | | 375/E7.076 |
| 2014/0198838 A1* | 7/2014 | Andrysco | H04N 19/172 |
| | | | 375/240.1 |
| 2016/0150212 A1* | 5/2016 | Moura | H04N 13/167 |
| | | | 375/240.02 |
| 2017/0171271 A1* | 6/2017 | Kelly | H04L 65/611 |
| 2017/0293356 A1 | 10/2017 | Khaderi et al. | |
| 2018/0027241 A1* | 1/2018 | Wu | H04N 19/119 |
| | | | 375/240.03 |
| 2018/0075582 A1 | 3/2018 | Chen et al. | |
| 2018/0095531 A1* | 4/2018 | Brown | H04N 21/42204 |
| 2020/0413113 A1 | 12/2020 | Tofighbakhsh et al. | |
| 2021/0019982 A1 | 1/2021 | Todd | |
| 2021/0227151 A1 | 7/2021 | Song et al. | |

FOREIGN PATENT DOCUMENTS

| | | |
|---|---|---|
| CN | 110944109 A | 3/2020 |
| CN | 112702641 A | 4/2021 |
| WO | 2020036502 A1 | 2/2020 |

OTHER PUBLICATIONS

Zhao et al, "Object Detection with Deep Learning: A Review," IEEE Transactions on Nural Networks and Learning Systems for Publication, Apr. 16, 2019, 21 pages.

IBM Watson Media, "Keyframes, InterFrame & Video Compression," 11 pages [Accessed Online Jun. 1, 2021] https://blog.video.ibm.com/streaming-video-tips/keyframes-interframe-video-compression.

Goggle AI Blog, "Leveraging Temporal Context for Object Detection," Posted by Sara Beery, Friday, Jun. 26, 2020, 7 pages.

* cited by examiner

CONTEXT BASED ADAPTIVE RESOLUTION MODULATION COUNTERING NETWORK LATENCY FLUCTUATION

BACKGROUND

The present invention relates to video streaming, and more specifically, to resolution modulation during video streaming.

SUMMARY

According to an embodiment, a method includes communicating a first stream of a video comprising first and second objects to a device. The first stream has a first resolution. The method also includes communicating a second stream to the device. The second stream indicates that the first object is contextual and that the second object is non-contextual. The method further includes, after a decrease in bandwidth, communicating a third stream of the video to the device. The third stream has a second resolution that is lower than the first resolution. When the video is presented for display using the third stream and based on the second stream indicating that the first object is contextual and that the second object is non-contextual, the first object is presented in the first resolution and the second object is presented in the second resolution. Other embodiments include an apparatus that performs this method.

According to another embodiment, a method includes receiving, at a device, a first stream of a video comprising first and second objects. The first stream has a first resolution. The method also includes receiving, at the device, a second stream that indicates that the first object is contextual and that the second object is non-contextual and after a decrease in bandwidth, receiving, at the device, a third stream of the video. The third stream has a second resolution that is lower than the first resolution. The method further includes, based on the second stream indicating that the first object is contextual and that the second object is non-contextual and when displaying the video using the third stream, displaying the first object in the first resolution and the second object in the second resolution. Other embodiments include an apparatus that performs this method.

DETAILED DESCRIPTION

Users are increasingly using the Internet to stream videos to their devices. As camera technology and network technology has improved, the resolution of these videos has increased. As the video resolutions increase, so does the amount of bandwidth needed to stream the videos. When streaming a video, if the network bandwidth unexpectedly drops (e.g., because of network congestion or interference), the stream may begin to stutter or stall. To avoid stuttering, a video service may reduce the resolution of the video stream when network bandwidth drops so that less bandwidth is needed to stream the video. Although reducing the video resolution does help with stuttering, it also degrades the user experience. In some instances, the video may become so blurry that the user cannot understand what is being presented in the video.

This disclosure describes a system that reduces video resolution when network bandwidth drops but maintains the resolution of contextual objects in the video (e.g., objects that are important to the understanding of the video). Generally, the system applies a machine learning process to a video to identify contextual and non-contextual objects in the video. The system then generates a separate stream that contains information about the contextual objects and non-contextual objects in the video. The separate stream may contain the contextual objects rendered at the higher resolution. The video stream and the separate stream are then communicated to a device so that the video may be viewed. When network bandwidth drops, the system may drop the resolution of the video stream. The device may use the information in the separate stream to display the contextual objects in the video at the higher resolution even though the rest of the video is displayed in a lower resolution. As a result, a user may find it easier to understand the video even when the resolution of the video is reduced to accommodate the drop in network bandwidth, in certain embodiments.

Figure 1A:
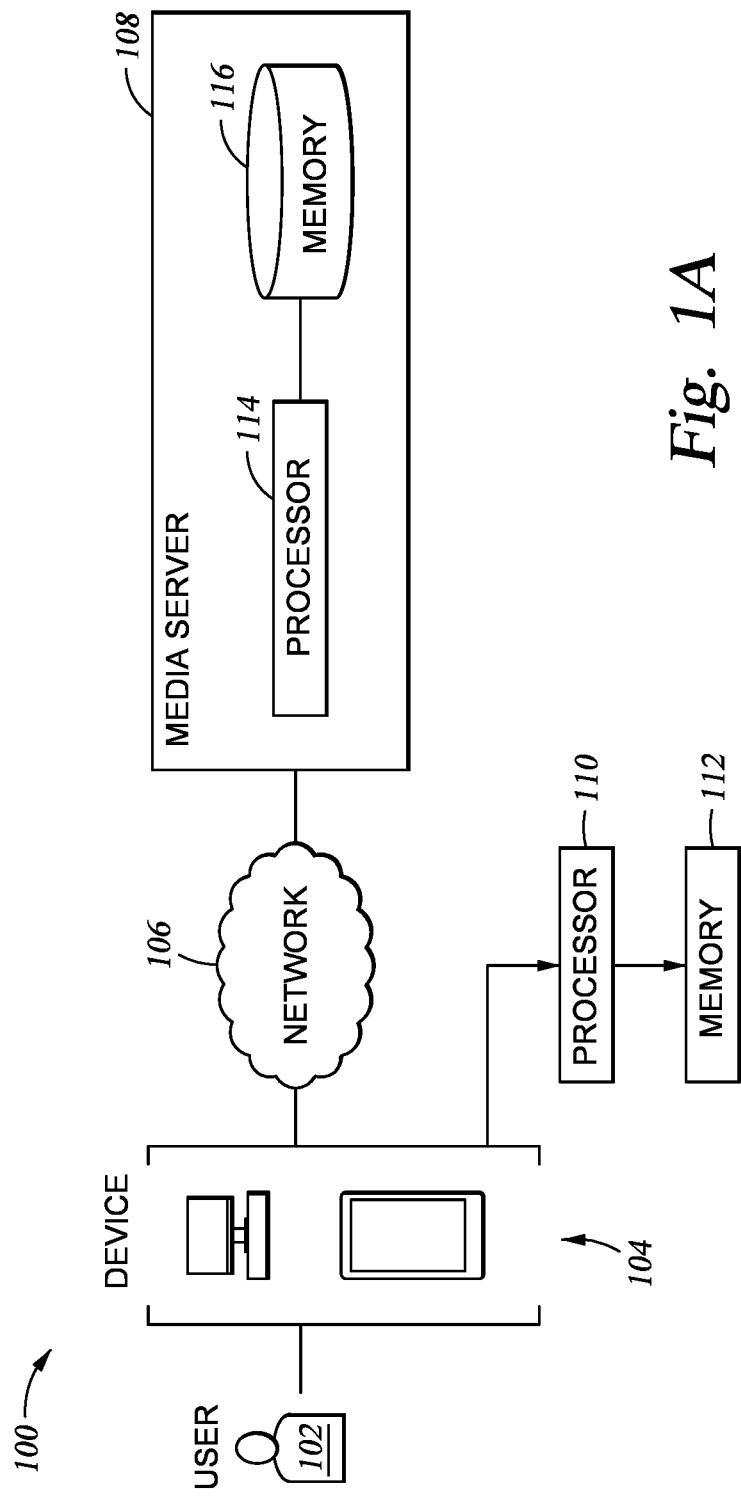
FIG. 1A illustrates an example system.

FIG. 1A illustrates an example system 100. As seen in FIG. 1A, the system 100 includes one or more devices 104, a network 106, and a media server 108. Generally, the media server 108 prepares and streams videos to the device 104 over the network 106. The media server 108 identifies contextual and non-contextual objects in a video and communicates an additional stream to the device 104 that includes information about the contextual and non-contextual objects. When a bandwidth drop occurs, the media server 108 reduces the resolution of the video. The device 104 then displays the video at the lower resolution, but maintains the contextual objects in the video at a higher resolution. As a result, a user 102 can still understand the video even when the video resolution has been lowered, in particular embodiments.

The user 102 uses the device 104 to stream and view videos from the media server 108. The device 104 receives and processes one or more streams from the media server 108 to determine how to display a video to the user 102. For example, the device 104 may receive and process a first stream from the media server 108 to display a video at particular resolutions indicated by the media server 108. The device 104 may receive and process a second stream from the media server 108 to determine contextual and non-contextual objects within the video. When a bandwidth drop occurs, the device 104 reduces the resolution of the displayed video but maintains the resolution of contextual objects within the video. As a result, the user 102 can still understand the video even when the video resolution is reduced, in particular embodiments. As seen in FIG. 1A, the device 104 includes a processor 110 and a memory 112, which are configured to perform any of the actions or functions of the device 104 described herein. For example, a software application designed using software code may be stored in the memory 112 and executed by the processor 110 to perform the functions of the device 104.

The device 104 is any suitable device for communicating with components of the system 100 over the network 106. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user 102.

The processor 110 is any electronic circuitry, including, but not limited to one or a combination of microprocessors, microcontrollers, application specific integrated circuits (ASIC), application specific instruction set processor (ASIP), and/or state machines, that communicatively couples to memory 112 and controls the operation of the device 104. The processor 110 may be 8-bit, 16-bit, 32-bit, 64-bit or of any other suitable architecture. The processor 110 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 110 may include other hardware that operates software to control and process information. The processor 110 executes software stored on the memory 112 to perform any of the functions described herein. The processor 110 controls the operation and administration of the device 104 by processing information (e.g., information received from the media server 108, network 106, and memory 112). The processor 110 is not limited to a single processing device and may encompass multiple processing devices.

The memory 112 may store, either permanently or temporarily, data, operational software, or other information for the processor 110. The memory 112 may include any one or a combination of volatile or non-volatile local or remote devices suitable for storing information. For example, the memory 112 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 112, a disk, a CD, or a flash drive. In particular embodiments, the software may include an application executable by the processor 110 to perform one or more of the functions described herein.

The network 106 is any suitable network operable to facilitate communication between the components of the system 100. The network 106 may include any interconnecting system capable of transmitting audio, video, signals, data, messages, or any combination of the preceding. The network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The media server 108 may be part of a content delivery network or streaming service that prepares and communicates streams to the device 104 over the network 106. For example, the media server 108 determines contextual and non-contextual objects within a video and then prepares and communicates a first stream for the video and a second stream indicating the contextual and non-contextual objects. Using these two streams, the media server 108 informs the device 104 as to which objects within the video should be maintained at a higher resolution when the resolution of the video is reduced, in particular embodiments. As seen in FIG. 1A, the media server 108 includes a processor 114 and a memory 116, which are configured to perform any of the actions or functions of the media server 108 described herein. For example, one or more software applications designed using software code may be stored in the memory 114 and executed by the processor 116 to perform the functions of the media server 108.

The processor 114 is any electronic circuitry, including, but not limited to one or a combination of microprocessors, microcontrollers, application specific integrated circuits (ASIC), application specific instruction set processor (ASIP), and/or state machines, that communicatively couples to memory 116 and controls the operation of the media server 108. The processor 114 may be 8-bit, 16-bit, 32-bit, 64-bit or of any other suitable architecture. The processor 114 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 114 may include other hardware that operates software to control and process information. The processor 114 executes software stored on the memory 116 to perform any of the functions described herein. The processor 114 controls the operation and administration of the media server 108 by processing information (e.g., information received from the device 104, network 106, and memory 116). The processor 114 is not limited to a single processing device and may encompass multiple processing devices.

The memory 116 may store, either permanently or temporarily, data, operational software, or other information for the processor 114. The memory 116 may include any one or a combination of volatile or non-volatile local or remote devices suitable for storing information. For example, the memory 116 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 116, a disk, a CD, or a flash drive. In particular embodiments, the software may include an application executable by the processor 114 to perform one or more of the functions described herein.

Figure 1B:
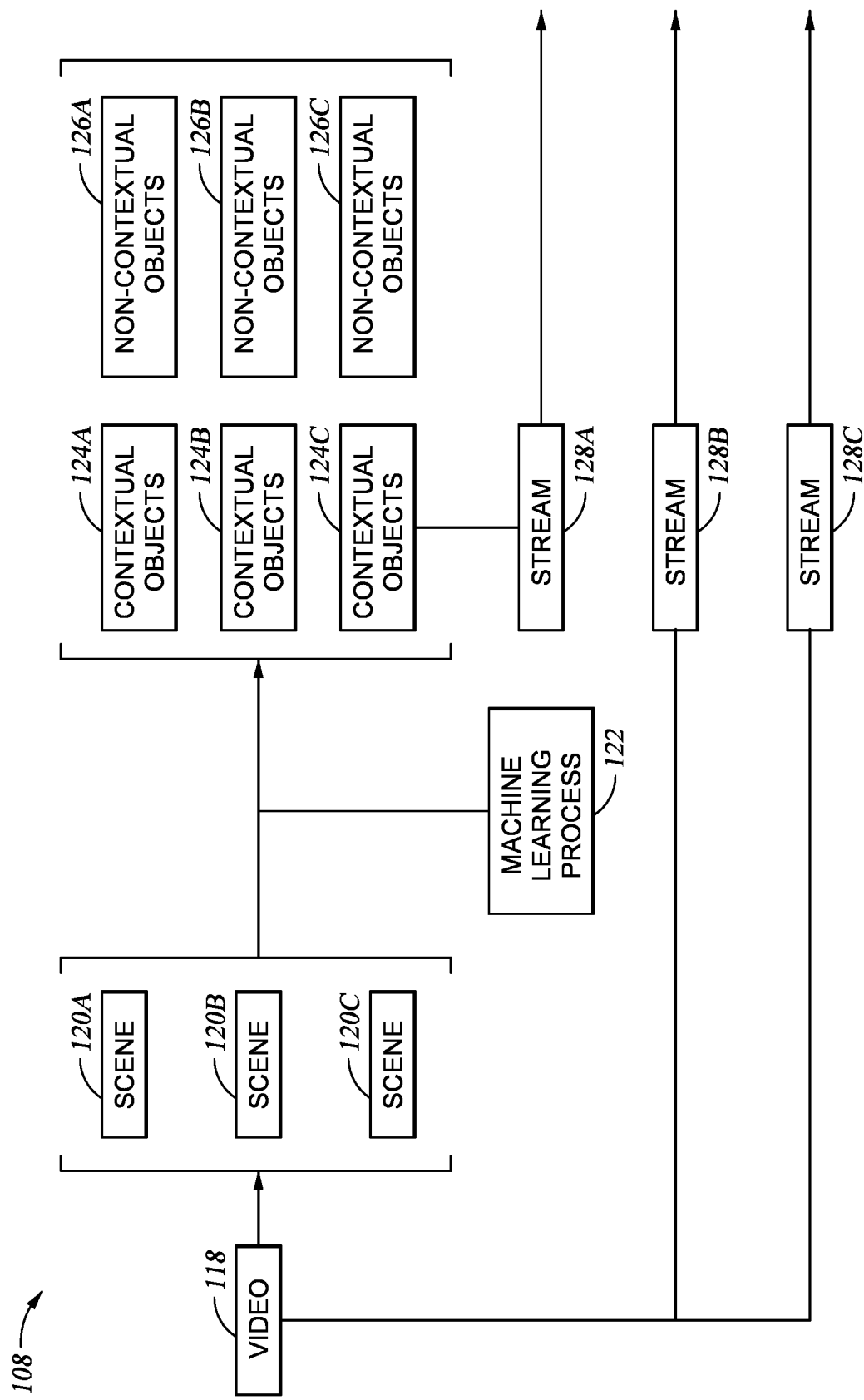
FIG. 1B illustrates an example media server of the system of FIG. 1A.

FIG. 1B illustrates an example media server 108 of the system 100 of FIG. 1A. The media server 108 analyzes a video 118 to determine contextual and non-contextual objects within the video 118. The video 118 may include one or more scenes 120, and each scene 120 may include different contextual and non-contextual objects. In the example of FIG. 1B, the video 118 includes scenes 120A, 120B, and 120C. The scene 120B occurs after the scene 120A and the scene 120C occurs after the scene 120B. Each of the scenes 120 depicts different events, objects, or characters that impact which objects within the scenes 120 are contextual and non-contextual. For example, if a scene 120 is of a person running through a field, the person may be a contextual object in the scene, but a flower in the field may be a non-contextual object in the scene. As another example, if the scene 120 is of an instructor writing on a whiteboard, the whiteboard may be a contextual object and the instructor may be a non-contextual object.

The media server 108 applies a machine learning process 122 to the video 118 to identify contextual objects and non-contextual objects in the scenes 120 of the video 118. The machine learning process 122 uses computer vision algorithms to perform image classification, object detection, and semantic segmentation in the scenes 120 of the video 118. For example, the machine learning process 122 may use object detection to identify the various objects within a scene 120. The machine learning process 122 may use image classification and semantic segmentation to determine which of the identified objects in the scene 120 are contextual or non-contextual. In certain embodiments, the machine learning process 122 uses a deep neural network to generate scene graphs and natural language captions for the scenes 120. The scene graphs may identify the progression of events in the scenes 120 of the video 118. The natural language captions show the words that are spoken or presented during the scenes 120. The deep neural network analyzes the progression of events along with the words that are spoken or presented during the events to identify contextual and non-contextual objects in the scenes 120.

In the example of FIG. 1B, the media server 108 applies the machine learning process 122 to the scenes 120A, 120B, and 120C to determine contextual objects 124 and non-contextual objects 126. The media server 108 identifies that the scene 120A includes contextual objects 124A and non-contextual objects 126A. The media server 108 also determines that the scene 120B includes contextual objects 124B and non-contextual objects 126B. The media server 108 further determines that the scene 120C includes contextual objects 124C and non-contextual objects 126C.

The media server 108 prepares a stream 128A for the video 118. The stream 128A includes an encoding of the video 118 at a particular resolution. The media server 108 then communicates the stream 128A to the device 104. The device 104 processes the stream 128A to display the video 118 at the particular resolution.

The media server 108 prepares a stream 128B that includes information about the contextual objects 124 and non-contextual objects 126 determined by the media server 108. For example, the stream 128B may indicate the times in the video 118 during which the various contextual objects 124 and non-contextual objects 126 appear. The stream 128B may also identify the coordinates in the video frames where the contextual objects 124 and non-contextual objects 126 appear. Using this information, the device 104 identifies where in the frames of the video 118 the contextual objects 124 and non-contextual objects 126 appear. In certain embodiments, the stream 128B also includes renderings of the contextual objects 124 at an original or higher resolution. For example, the renderings of the contextual objects 124 may be at the same resolution as the video 118 in the stream 128A. The media server 108 communicates the stream 128B to the device 104 so that the device 104 may identify and locate the contextual objects 124 and the non-contextual objects 126 when they appear in the video 118.

When a bandwidth drop occurs, the media server 108 reduces the resolution of the video 118 that is streamed to the device 104 to avoid stuttering or stalling. The media server 108 prepares a stream 128C that includes an encoding of the video 118 at a lower resolution. The resolution of the video in the stream 128C is lower than the resolution of the video 118 in the stream 128A. The media server 108 may stop communicating the stream 128A to the device 104 and begin communicating the stream 128C to the device 104. After receiving the stream 128C, the device 104 begins displaying the video 118 at the reduced resolution.

When the device 104 displays the video 118 at the reduced resolution, the device 104 uses the information in the stream 128B to identify and locate the contextual objects 124 in the video 118. The device 104 then displays the contextual objects 124 at a higher resolution when the contextual objects 124 appear in the video 118. As a result, even though the resolution of the video 118 is reduced, the device 104 maintains the resolution of the contextual objects 124 to help a user 102 understand the video 118. For example, if the video 118 is in the scene 120B when the bandwidth drop occurs, the media server 108 communicates the stream 128C to the device 104 to reduce the resolution of the video 118. The device 104 then displays the video 118 at the reduced resolution. The device 104 also uses the information in the stream 128B to determine the location of the contextual objects 124B in the video 118. The device 104 then displays the contextual objects 124B in the original, higher resolution.

Figure 1C:
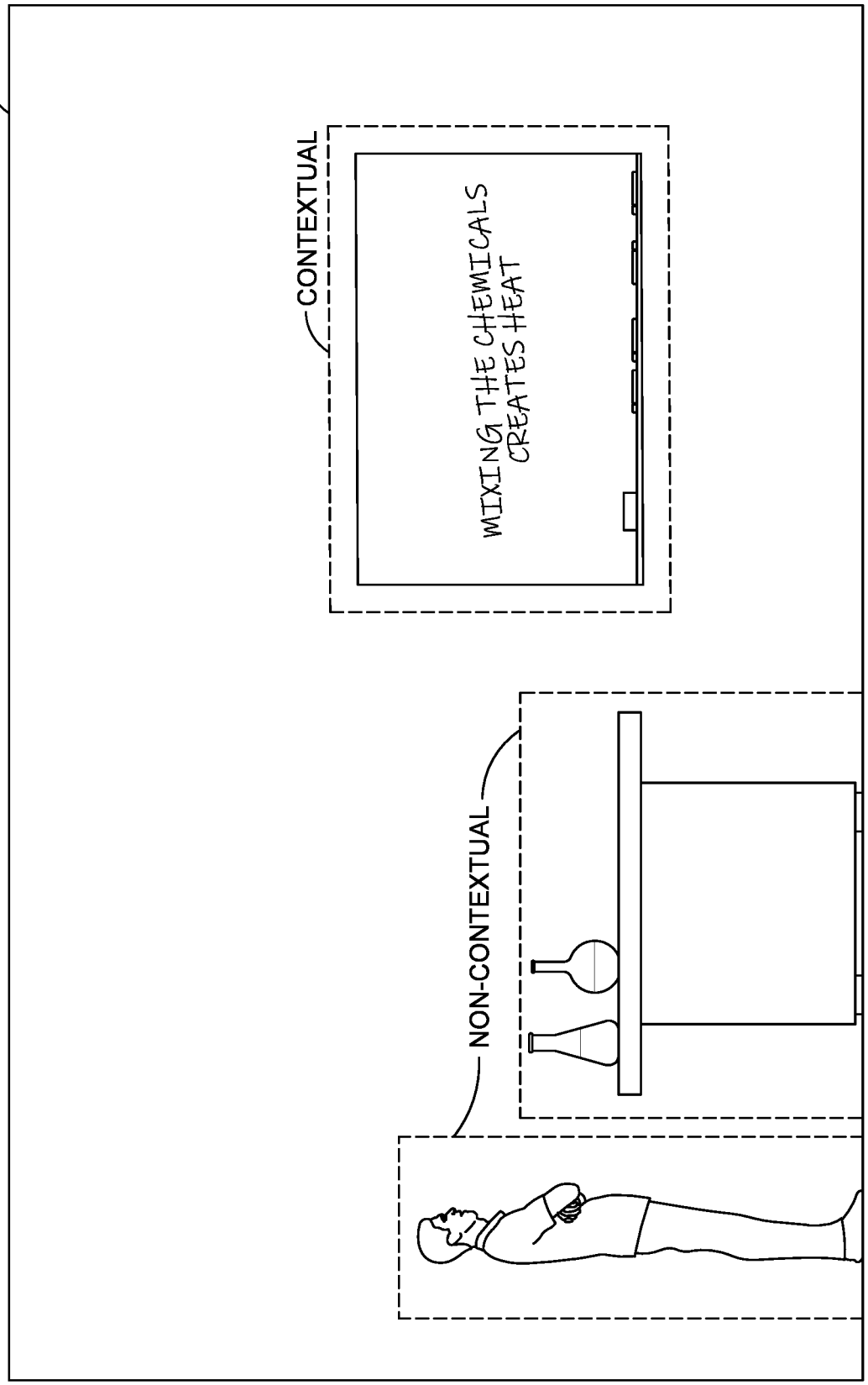
FIGS. 1C and 1D illustrate an example scene.
Figure 1D:
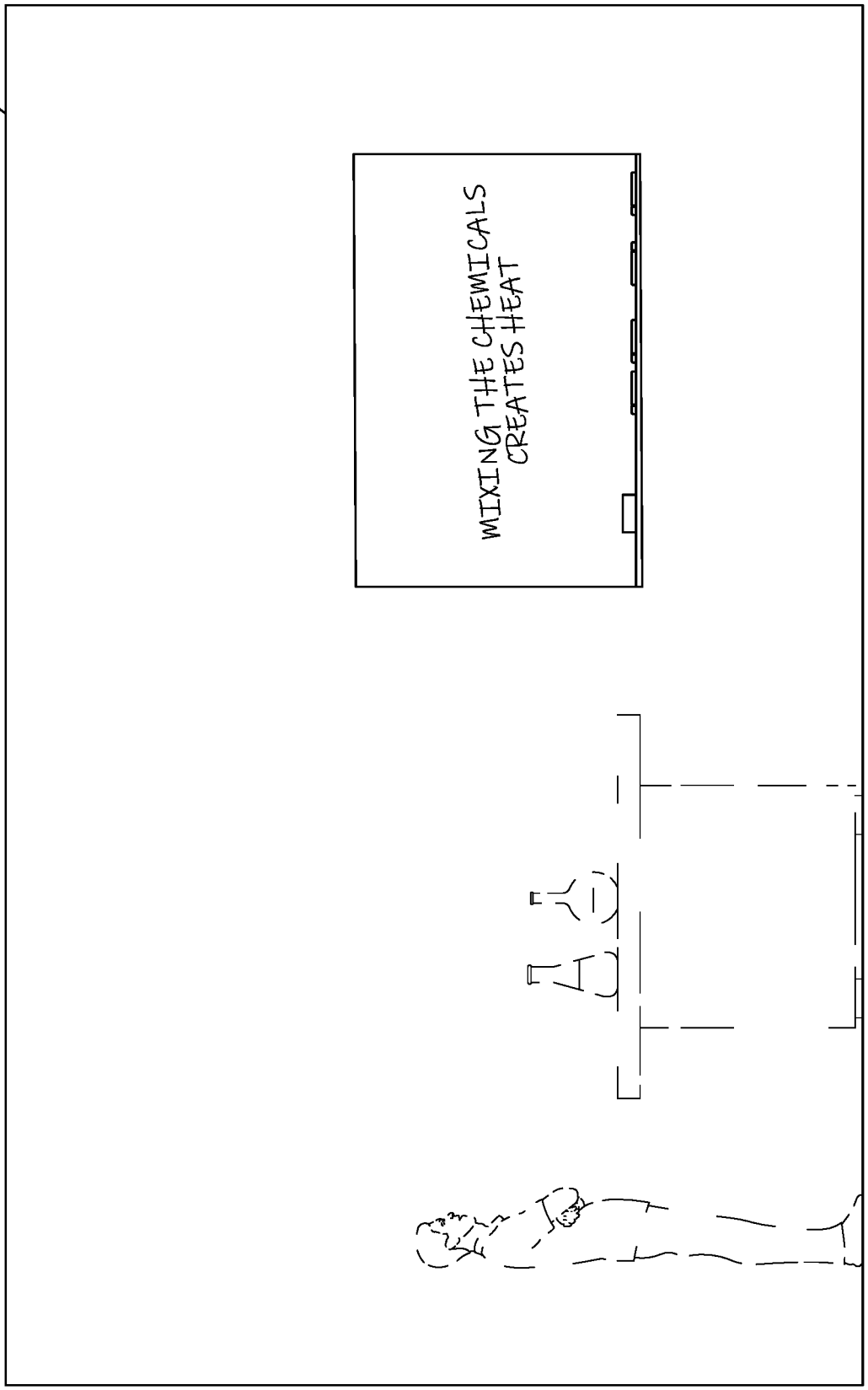

FIGS. 1C and 1D illustrate an example scene 120A of a video 118. As seen in FIG. 1C, the scene 120A includes an instructor, a workbench, and a white board. Chemicals are positioned on the workbench and the instructor has written the words "Mixing the chemicals creates heat" on the whiteboard. The media server 108 applies the machine learning process 122 to the scene 120A to determine that certain objects within the scene 120A are contextual and certain objects are non-contextual. In the example of FIG. 1C, the media server 108 determines that the whiteboard is a contextual object 124A in the scene 120A, but the instructor and the workbench are non-contextual objects 126A within the scene 120A. For example, the media server 108 may apply the machine learning process 122 to determine that in the scene 120A the instructor is writing the words on the whiteboard or is reciting the words on the whiteboard but that the instructor is not mixing the chemicals on the workbench. The media server 108 then determines that the whiteboard is a contextual object 124A but that the instructor and the chemicals are non-contextual objects 126A. The media server 108 communicates the stream 128B to the device 104 to indicate the locations of the contextual objects 124A and the non-contextual objects 126A.

As the device 104 is playing through the scene 120A, a bandwidth drop may occur. For example, the device 104 may move to a location with poor reception or congestion may occur on the network 106. When the bandwidth drop occurs, the media server 108 reduces the resolution of the video 118 and communicates another stream 128C that includes an encoding of the video 118 at the lower resolution. When the device 104 receives the stream 128C, the device 104 begins displaying the scene 120A at the reduced resolution. As seen in FIG. 1D, the scene 120A is displayed at a lower resolution because the instructor and the workbench are blurry. The device 104 uses information in the stream 128B to locate the contextual objects 124A within the scene 120A. The device 104 then displays the contextual objects 124A within the scene 120A at a higher resolution while the other objects in the scene 120A are displayed at the reduced resolution. As seen in the example of FIG. 1D, the whiteboard is displayed at the original higher resolution, but the instructor and the workbench are displayed at the lower resolution. In this manner, when a user 102 is viewing the scene 120A, the words on the white board remain legible to the user 102, which helps the user 102 understand the scene 120A even though the instructor and the workbench are blurry, in certain embodiments.

Figure 1E:
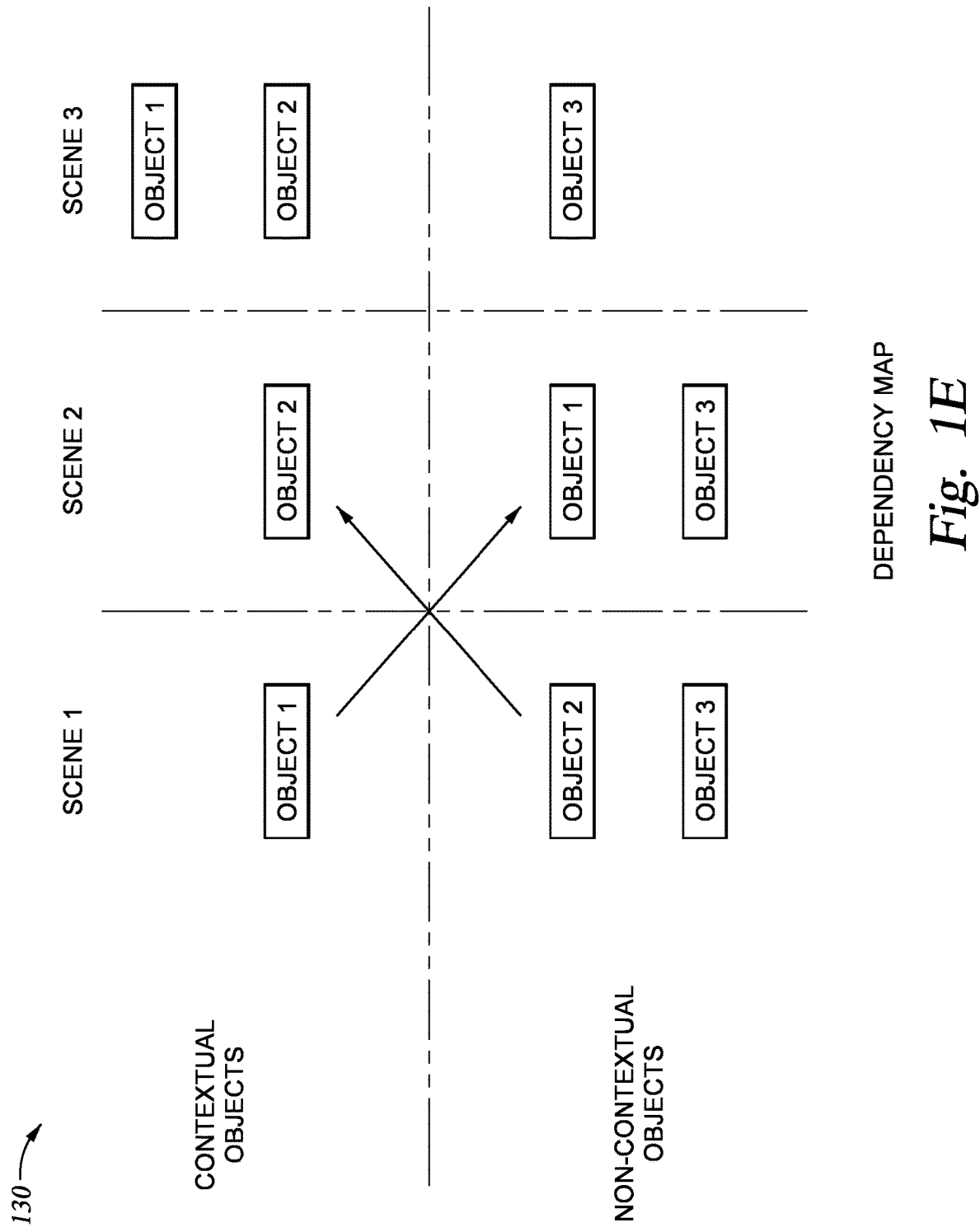
FIG. 1E illustrates an example dependency map.

FIG. 1E illustrates an example dependency map 130. In certain embodiments, the media server 108 generates the dependency map 130 to indicate the transition of various objects from scene-to-scene in the video 118. The dependency map 130 indicates whether certain objects remain contextual or become non-contextual as the video 118 progresses through the scenes 120. In the example of FIG. 1E, the dependency map 130 shows the transition of objects across three scenes of the video 118. In Scene 1, Object 1 is contextual and Objects 2 and 3 are non-contextual. In Scene 2, Object 1 becomes non-contextual and the Object 2 becomes contextual. In Scene 3, Object 1 becomes contextual again.

In certain embodiments, the media server 108 uses the dependency map 130 to determine which objects should be maintained at a higher resolution when the resolution of the video 118 is reduced. Based on the dependency map 130, the media server 108 may determine that a non-contextual object within a scene should be maintained at a higher resolution because that object becomes contextual in a subsequent scene. Using the example of FIG. 1E, the media server 108 may determine that Object 2 should be maintained at a higher resolution during Scene 1 even though Object 2 is non-contextual in Scene 1, because Object 2 becomes contextual in Scene 2. In response, the media server 108 includes information in the stream 128B that indicates Object 2 is non-contextual in Scene 1 but should be maintained at a higher resolution during Scene 1. The media server 108 may also include a rendering of Object 2 at the higher resolution in the stream 128B. When the bandwidth drop occurs, the device 104 reviews the information in the stream 128B and maintains Object 1 and Object 2 at the original higher resolution during Scene 1.

Figure 1F:
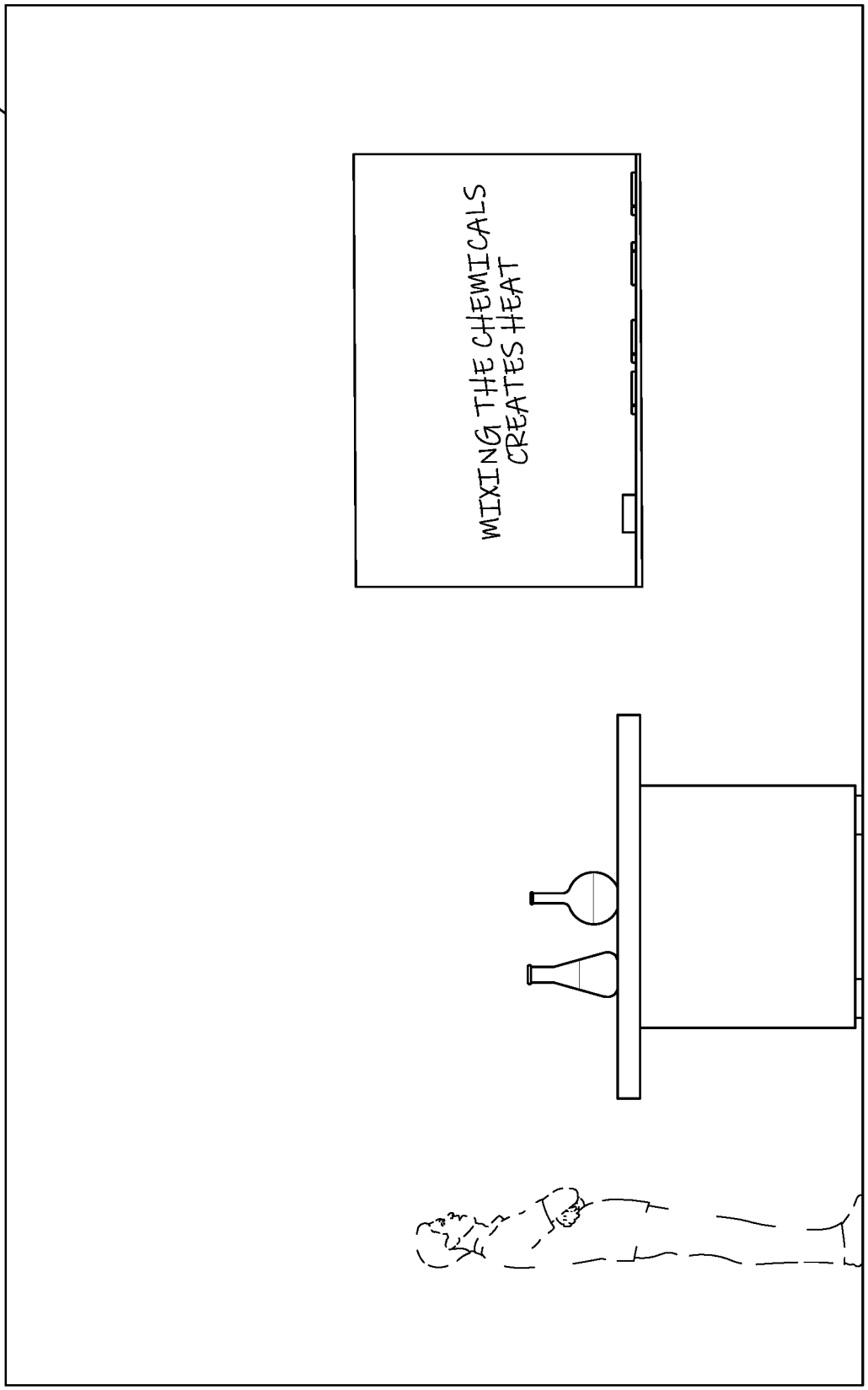
FIG. 1F illustrates an example scene.

FIG. 1F illustrates the scene 120A shown in FIGS. 1C and 1D if the dependency map 130 had been used. The media server 108 may have indicated in the dependency map 130 that the whiteboard is contextual in the scene 120A and that the workbench is non-contextual in the scene 120A. However, the dependency map 130 may indicate that the workbench becomes contextual in a subsequent scene (e.g., scene 120B). In response, the media server 108 may determine that the workbench should be maintained at the original higher resolution during the scene 120A. The media server 108 includes information in the stream 128B that indicates that the workbench should be maintained at the original higher resolution during the scene 120A. The device 104 analyzes the information in the stream 128B and when the resolution of the video 118 is reduced, the device 104 maintains the whiteboard and the workbench at the original higher resolution. As a result, and as seen in FIG. 1F, during the scene 120A, the device 104 maintains the whiteboard and the workbench at the original higher resolution while the instructor is displayed at the lower resolution.

Figure 2:
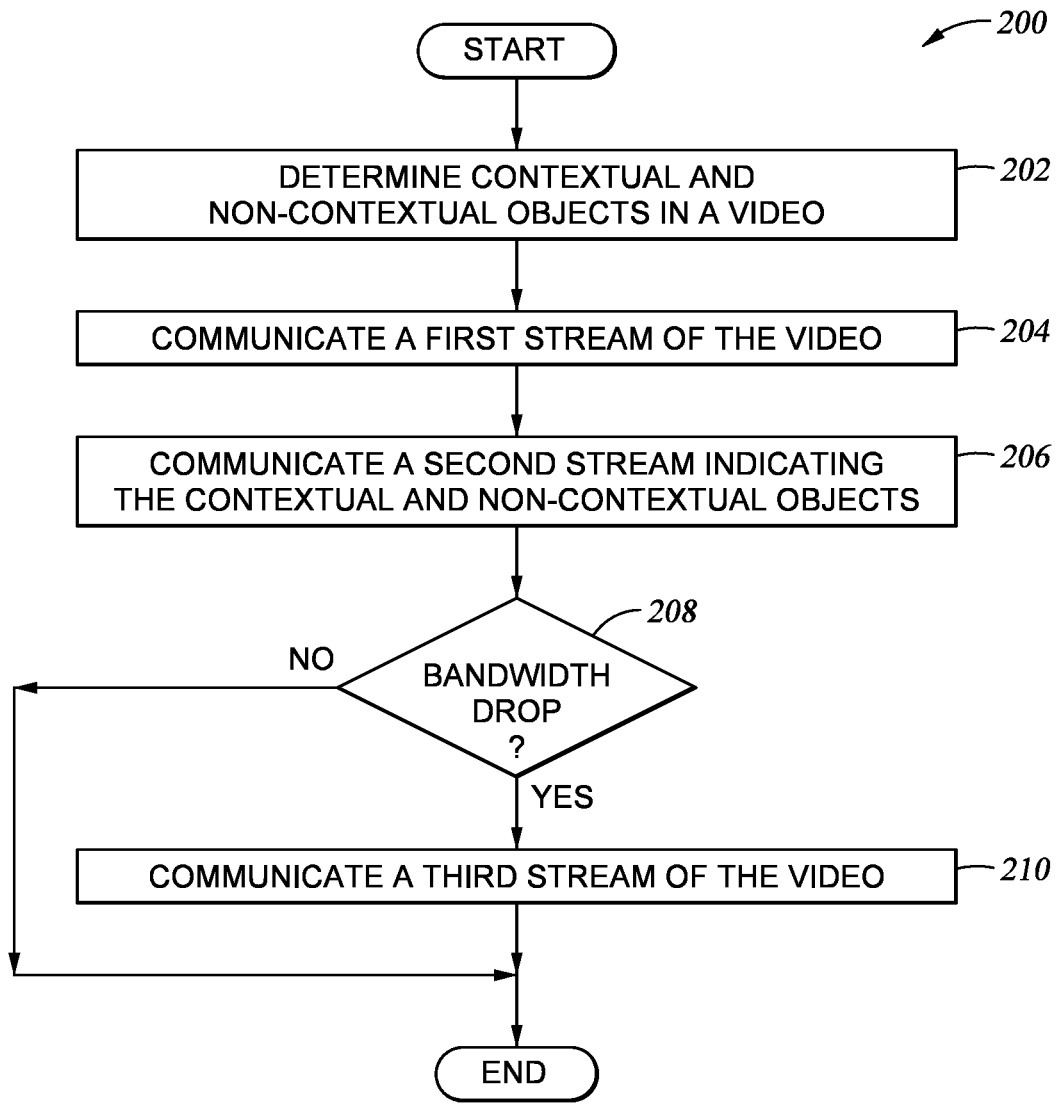
FIG. 2 is a flowchart of an example method performed in the system of FIG. 1A.

FIG. 2 is a flowchart of an example method 200 performed in the system 100 of FIG. 1A. In particular embodiments, the media server 108 performs the method 200. By performing the method 200, the media server 108 identifies contextual objects 124 in a video 118 so that a device 104 may maintain the resolution of the contextual objects 124 when the resolution of the video 118 is reduced.

In block 202, the media server 108 determines contextual objects 124 and non-contextual objects 126 in a video 118. The media server 108 may apply a machine learning process 122 to the scenes 120 of the video 118 to locate the objects within the scenes 120. The machine learning process 122 may then determine the progression of events in the scenes 120 and the words spoken within the scenes 120 to determine which of the identified objects are contextual objects 124 and which of the objects are non-contextual objects 126.

The media server 108 communicates a first stream 128A of the video 118 in block 204. The first stream 128A includes an encoding of the video 118 at a higher resolution. The media server 108 communicates the stream 128A to a device 104 so that the device 104 can display the video 118 at the higher resolution. In block 206, the media server 108 communicates a second stream 128B that indicates the contextual objects 124 and the non-contextual objects 126 in the video 118. The second stream 128B may identify the contextual objects 124 and the non-contextual objects 126 in the scenes 120 in which they appear. The stream 128B may also include coordinates that indicate the position of the contextual objects 124 and the non-contextual objects 126 in the frames of the video 118. In some embodiments, the stream 128B also includes renderings of the contextual objects 124 and/or the non-contextual objects 126 at the higher resolution. The device 104 may use the information within the stream 128B to maintain the resolution of contextual objects 124 when the resolution of the video 118 is reduced.

In block 208, the media server 108 determines whether a bandwidth drop occurs. The bandwidth drop may be caused by the device 104 moving to a location with poor reception or congestion occurring on the network 106. The media server 108 may determine that a bandwidth drop occurred by analyzing the network traffic between the device 104 and the media server 108. For example, the media server 108 may determine an amount of time that it takes for the device 104 to acknowledge packets communicated by the media server 108. As another example, the media server 108 may determine a number of packets that are dropped by the device 104. When the device 104 begins dropping more packets than usual or when the device 104 takes longer to acknowledge packets sent by the media server 108, the media server 108 may determine that a bandwidth drop has occurred.

In block 210, the media server 108 communicates a third stream 128C to the device 104 when the media server 108 determines that a bandwidth drop has occurred. The third stream 128C includes an encoding of the video 118 at a reduced resolution. By reducing the resolution of the video 118, the media server 108 reduces the chances that the video 118 stutters or stalls on the device 104 as a result of the bandwidth drop. When the device 104 receives the third stream 128C, the device 104 begins displaying the video 118 at the reduced resolution. The device 104 uses the information within the second stream 128B to maintain the resolution of the contextual objects 124 within the video 118.

Figure 3:
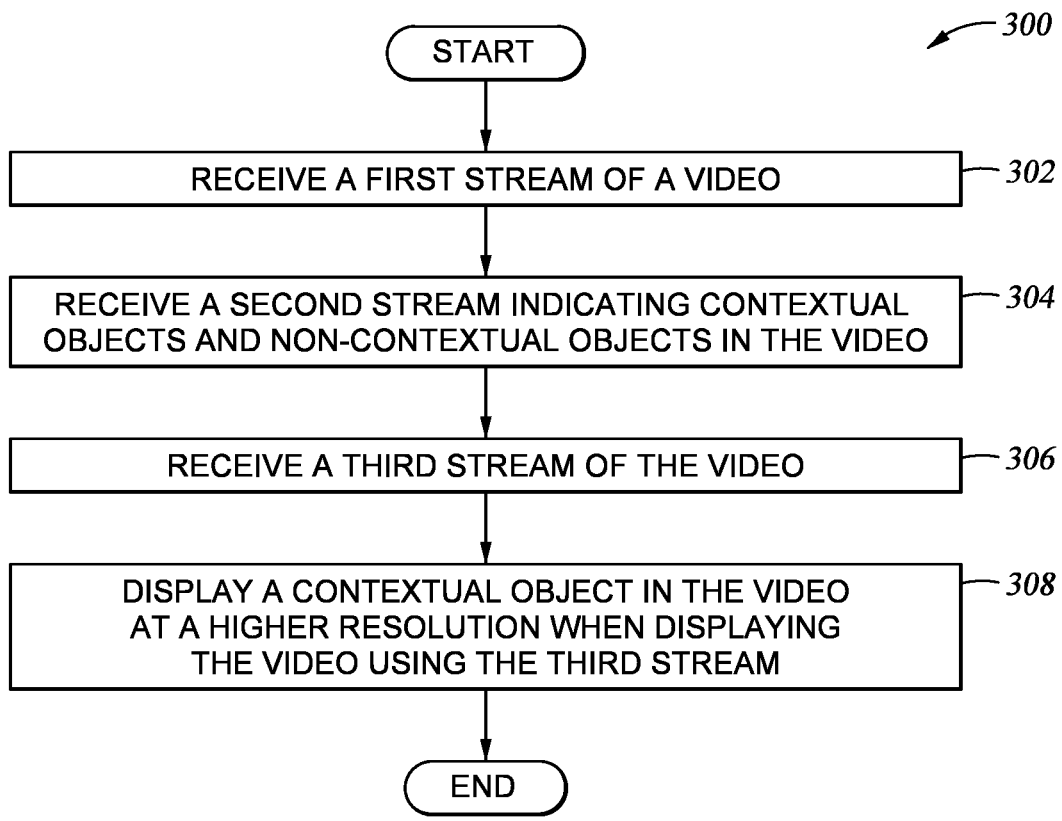
FIG. 3 is a flowchart of an example method performed in the system of FIG. 1A.

FIG. 3 is a flowchart of an example method 300 performed in the system 100 of FIG. 1A. In particular embodiments, the device 104 performs the method 300. By performing the method 300, the device 104 locates contextual objects 124 within a video 118 and maintains the resolution of the contextual objects 124 when the resolution of the video 118 is reduced.

In block 302, the device 104 receives a first stream 128A of a video 118 from the media server 108. The first stream 128A includes an encoding of the video 118 at an original higher resolution. The device 104 displays the video 118 at the higher resolution after the device 104 receives the stream 128A.

In block 304, the device 104 receives a second stream 128B from the media server 108. The second stream 128B indicates the contextual objects 124 and the non-contextual objects 126 in the video 118. For example, the second stream 128B may identify the contextual objects 124, the non-contextual objects 126, and the scenes 120 of the video 118 in which the contextual objects 124 and the non-contextual objects 126 appear. Additionally, the stream 128B may include coordinates that indicate the position of the contextual objects 124 and the non-contextual objects 126 within the frames of the video 118. In some embodiments, the stream 128B includes renderings of the contextual objects 124 and/or the non-contextual objects 126 at the original higher resolution. The device 104 uses the information within the stream 128B to maintain the resolution of the contextual objects 124 when the resolution of the video 118 is reduced.

In block 306, the device 104 receives a third stream 128C of the video 118. The media server 108 may have communicated the third stream 128C after determining that a bandwidth drop has occurred. The stream 128C includes an encoding of the video 118 at a reduced resolution. When the device 104 receives the stream 128C, the device 104 begins displaying the video 118 at the reduced resolution. In block 308, the device 104 displays a contextual object 124 in the video 118 at the original higher resolution when displaying the video 118 at the reduced resolution using the stream 128C. For example, when the device 104 reduces the resolution of the video 118, the device 104 examines the information in the stream 128B to determine which contextual objects 124 are being displayed in the video 118. The device 104 may also determine the location of the contextual objects 124 being displayed in the video 118. The device 104 then maintains the resolution of the contextual objects 124 in the video 118 such that the contextual objects in the video 118 are displayed at the original higher resolution while the remaining portions of the video 118 are displayed at the reduced resolution. In some embodiments, the device 104 retrieves the renderings of the contextual objects 124 at the higher resolution from the stream 128B and replaces the contextual objects 124 within the video 118 with the higher resolution renderings. In this manner, the device 104 displays the video 118 at a reduced resolution, but maintains the contextual objects 124 in the video 118 at the original higher resolution which assists a user 102 to understand the video 118, in particular embodiments.

Figure 4:
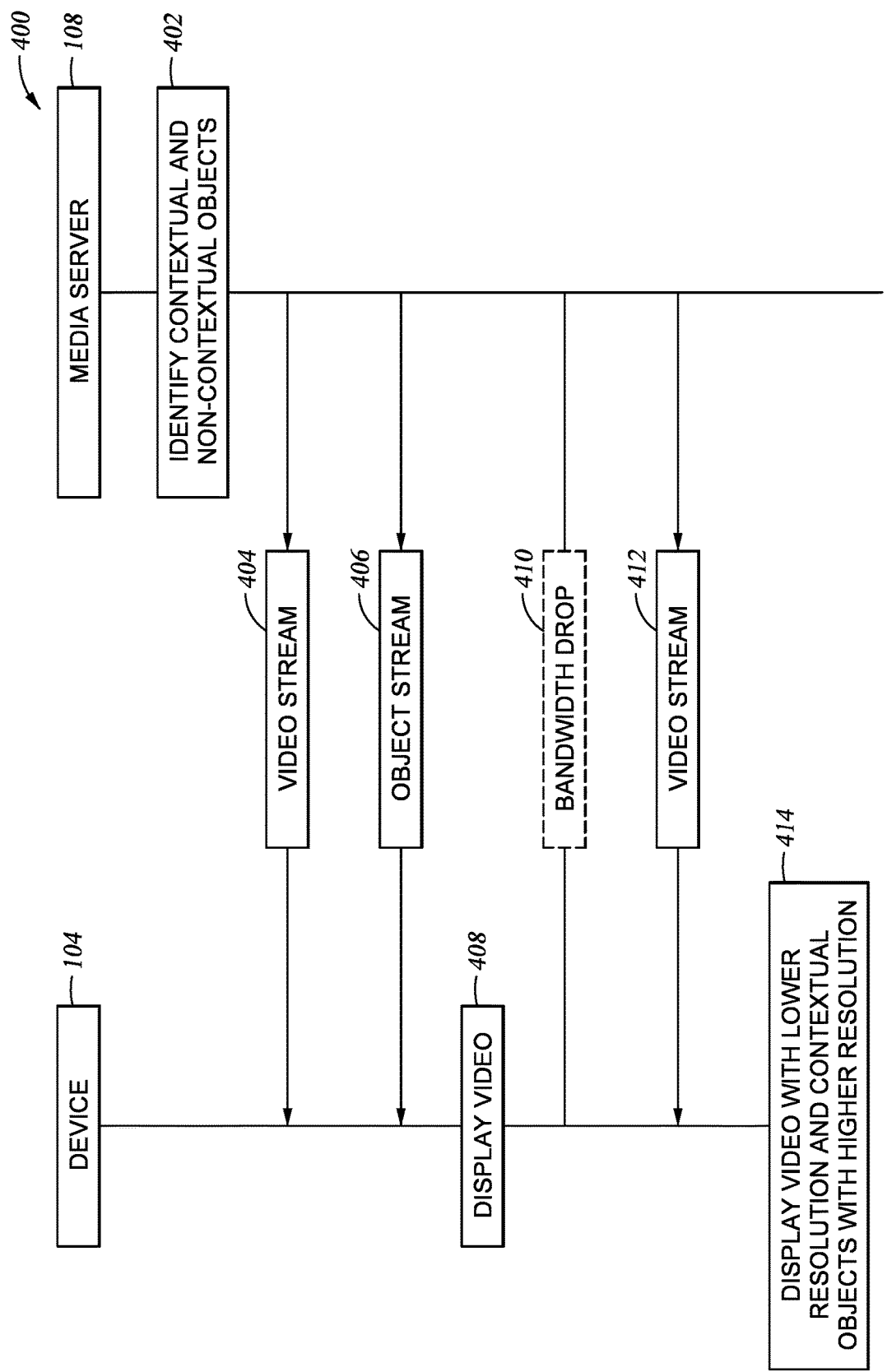
FIG. 4 illustrates an example operation of the system in FIG. 1A.

FIG. 4 illustrates an example operation 400 of the system 100 in FIG. 1A. As seen in FIG. 4, the media server 108 begins by identifying contextual and non-contextual objects in block 402. The media server 108 applies a machine learning process 122 to the scenes 120 of the video 118 to determine the contextual objects 124 and the non-contextual objects 126 within the video 118. The media server 108 then communicates a video stream 404 to the device 104. The video stream 404 includes an encoding of the video 118 at an original, higher resolution. The media server 108 also communicates an object stream 406 to the device 104. The object stream 406 includes information that identifies the contextual objects 124 and the non-contextual objects 126 within the video 118. In some embodiments, the object stream 406 includes renderings of the contextual objects 124 at the original, higher resolution.

The device 104 displays the video 118 in block 408. For example, the device 104 may render the video 118 using the information within the video stream 404. At 410, a bandwidth drop occurs. The media server 108 may determine that the bandwidth drop occurred based on traffic flows between the device 104 and the media server 108. In response to detecting the bandwidth drop, the media server 108 reduces the resolution of the video 118 and communicates a video stream 412 to the device 104. The video stream 412 includes an encoding of the video 118 at the reduced resolution. The device 104 then displays the video with a lower resolution in block 414. Additionally, the device 104 uses the information within the object stream 406 to identify and locate contextual objects 124 within the video 118. The device 104 then displays the contextual objects 124 in the video 118 at the original, higher resolution even though the video resolution is reduced. In this manner, the device 104 maintains the resolution of the contextual objects 124, which assists a user 102 to understand the video 118.

In summary, this disclosure describes a system 100 that reduces video resolution when network bandwidth drops but maintains the resolution of contextual objects in the video (e.g., objects that are important to the understanding of the video). Generally, the system 100 applies a machine learning process 122 to a video 118 to identify contextual and non-contextual objects 124 and 126 in the video 118. The system 100 then generates a separate stream 128B that contains information about the contextual objects 124 and non-contextual objects 126 in the video 118. The separate stream 128B may even contain the contextual objects 124 rendered at the higher resolution. The video stream 128A and the separate stream 128B are then communicated to a device 104 so that the video 118 may be viewed. When network bandwidth drops, the system 100 may drop the resolution of the video stream. The device 104 may use the information in the separate stream 128B to display the contextual objects 124 in the video 118 at the higher resolution even though the rest of the video 118 is displayed in a lower resolution. As a result, a user 102 may find it easier to understand the video 118 even when the resolution of the video 118 is reduced to accommodate the drop in network bandwidth, in certain embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention"

shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access the media server 108 or related data available in the cloud. For example, the streaming media server 108 could execute on a computing system in the cloud. In such a case, the media server 108 could store video 118 at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
    communicating a first stream of a video comprising first and second objects to a device, wherein the first stream has a first resolution;
    communicating a second stream to the device, wherein the second stream indicates that the first object is contextual and that the second object is non-contextual; and
    after a decrease in bandwidth, communicating a third stream of the video to the device, wherein the third stream has a second resolution that is lower than the first resolution, and wherein, when the video is presented for display using the third stream and based on the second stream indicating that the first object is contextual and that the second object is non-contextual, the first object is presented in the first resolution and the second object is presented in the second resolution.

2. The method of claim 1, wherein the second stream comprises the first object in the first resolution.

3. The method of claim 1, further comprising generating a dependency map that indicates that a third object is non-contextual in a first scene of the video and that the third object is contextual in a second scene of the video, wherein the second scene occurs after the first scene, and wherein the first scene and the second scene are presented when the video is presented for display using the third stream.

4. The method of claim 3, wherein, based on the dependency map indicating that the third object is contextual in the second scene, the third object is presented in the first resolution when the first scene is presented.

5. The method of claim 3, wherein:
    the dependency map further indicates that the first object is non-contextual in the second scene; and
    based on the dependency map indicating that the first object is non-contextual in the second scene, the first object is presented in the second resolution when the second scene is presented.

6. The method of claim 3, wherein the second stream is generated based on the dependency map and wherein the second stream indicates that the third object is non-contextual in the first scene and contextual in the second scene.

7. The method of claim 1, further comprising applying a machine learning process to the video to determine that the first object is contextual and that the second object is non-contextual.

8. An apparatus comprising:
    a memory; and
    a hardware processor communicatively coupled to the memory, the hardware processor configured to:
        communicate a first stream of a video comprising first and second objects to a device, wherein the first stream has a first resolution;
        communicate a second stream to the device, wherein the second stream indicates that the first object is contextual and that the second object is non-contextual; and
        after detecting a decrease in bandwidth, communicate a third stream of the video to the device, wherein the third stream has a second resolution that is lower than the first resolution, and wherein, when the video is presented for display using the third stream and based on the second stream indicating that the first object is contextual and that the second object is non-contextual, the first object is presented in the first resolution and the second object is presented in the second resolution.

9. The apparatus of claim 8, wherein the second stream comprises the first object in the first resolution.

10. The apparatus of claim 8, the hardware processor further configured to generate a dependency map that indicates that a third object is non-contextual in a first scene of the video and that the third object is contextual in a second scene of the video, wherein the second scene occurs after the first scene, and wherein the first scene and the second scene are presented when the video is presented for display using the third stream.

11. The apparatus of claim 10, wherein, based on the dependency map indicating that the third object is contextual in the second scene, the third object is presented in the first resolution when the first scene is presented.

12. The apparatus of claim 10, wherein:
    the dependency map further indicates that the first object is non-contextual in the second scene; and
    based on the dependency map indicating that the first object is non-contextual in the second scene, the first object is presented in the second resolution when the second scene is presented.

13. The apparatus of claim 10, wherein the second stream is generated based on the dependency map and wherein the second stream indicates that the third object is non-contextual in the first scene and contextual in the second scene.

14. The apparatus of claim 8, the hardware processor further configured to apply a machine learning process to the video to determine that the first object is contextual and that the second object is non-contextual.

15. A method comprising:
receiving, at a device, a first stream of a video comprising first and second objects, wherein the first stream has a first resolution;
receiving, at the device, a second stream that indicates that the first object is contextual and that the second object is non-contextual;
after a decrease in bandwidth, receiving, at the device, a third stream of the video, wherein the third stream has a second resolution that is lower than the first resolution; and
based on the second stream indicating that the first object is contextual and that the second object is non-contextual and when displaying the video using the third stream, displaying the first object in the first resolution and the second object in the second resolution.

16. The method of claim 15, wherein the second stream comprises the first object in the first resolution.

17. The method of claim 15, wherein a first scene of the video and a second scene of the video are displayed when displaying the video using the third stream, wherein the second scene occurs after the first scene, and wherein, based on a dependency map indicating that a third object is non-contextual in the first scene and that the third object is contextual in the second scene, displaying the third object in the first resolution when displaying the first scene.

18. The method of claim 17, wherein:
the dependency map further indicates that the first object is non-contextual in the second scene; and
based on the dependency map indicating that the first object is non-contextual in the second scene, displaying the first object in the second resolution when displaying the second scene.

19. The method of claim 17, wherein the second stream is generated based on the dependency map and wherein the second stream indicates that the third object is non-contextual in the first scene and contextual in the second scene.

20. The method of claim 15, wherein a machine learning process is applied to the video to determine that the first object is contextual and that the second object is non-contextual.

* * * * *